US005259825A

United States Patent [19]

De Angelis et al.

[11] Patent Number: 5,259,825

[45] Date of Patent: Nov. 9, 1993

[54] MACHINE FOR FOLDING AND GLUEING THE FLAPS OF A COATING PAPER TO CARDBOARD

[75] Inventors: Luciano De Angelis; Maresco Magnolfi; Paolo Lombardo; Rinaldo Scalabrella, all of Florence, Italy

[73] Assignee: Universal RIBO S.r.l., Florence, Italy

[21] Appl. No.: 706,287

[22] Filed: May 28, 1991

[30] Foreign Application Priority Data

Jun. 1, 1990 [IT] Italy ................................ 9411 A/90

[51] Int. Cl.[5] ...................... B65H 45/16; B65H 45/30; B31F 1/00; B32B 3/04

[52] U.S. Cl. .................................... 493/177; 493/110; 493/144; 493/434; 493/947; 156/216; 156/227; 156/479; 156/487

[58] Field of Search ............... 493/110, 111, 126, 127, 493/141-142, 144, 147, 151, 177, 180, 182, 442, 947, 416, 417, 436, 453, 454, 410; 53/206, 207, 209; 156/216, 227, 475, 479-480, 487

[56] References Cited

U.S. PATENT DOCUMENTS 2,757,586 8/1956 Haessler ............................. 493/111
3,807,289 4/1974 LaBombarde .................. 493/180 X
4,248,657 2/1981 Henry ............................ 156/227 X
4,600,346 7/1986 Podosek .......................... 493/110 X
4,701,238 10/1987 Boucher .......................... 156/216 X

FOREIGN PATENT DOCUMENTS 669051 11/1938 Fed. Rep. of Germany .

*Primary Examiner*—William E. Terrell
*Attorney, Agent, or Firm*—McGlew and Tuttle

[57] ABSTRACT

The machine comprises: a first assembly (2) with receiving, pressure and feed elements (3, 5), through which the part-finished item is fed, and downstream of these two elements a first folder roller (9) with a line of bristles, for folding and glueing the first front flap, and a pair of pressure rollers; a second assembly (20) with receiving, pressure and feed elements in the opposite direction, with a second folder roller (29) and a pair of pressure rollers (39) for folding the second flap, now the front flap; downstream of the second assembly (20) there is an assembly (219) with a transverse conveyor (320) for moving the part-finished item in two opposite directions (fC, fD), with two assemblies (220, 222) for successively folding and glueing the remaining two flaps of the paper.

12 Claims, 8 Drawing Sheets 13
29
1
338
340
222
324
334
333
342
fE
1A
III
fD
39
321
321A
3
9
fC
320
327
326
322
13
11
12
219
328
220
332
III Fig. 5
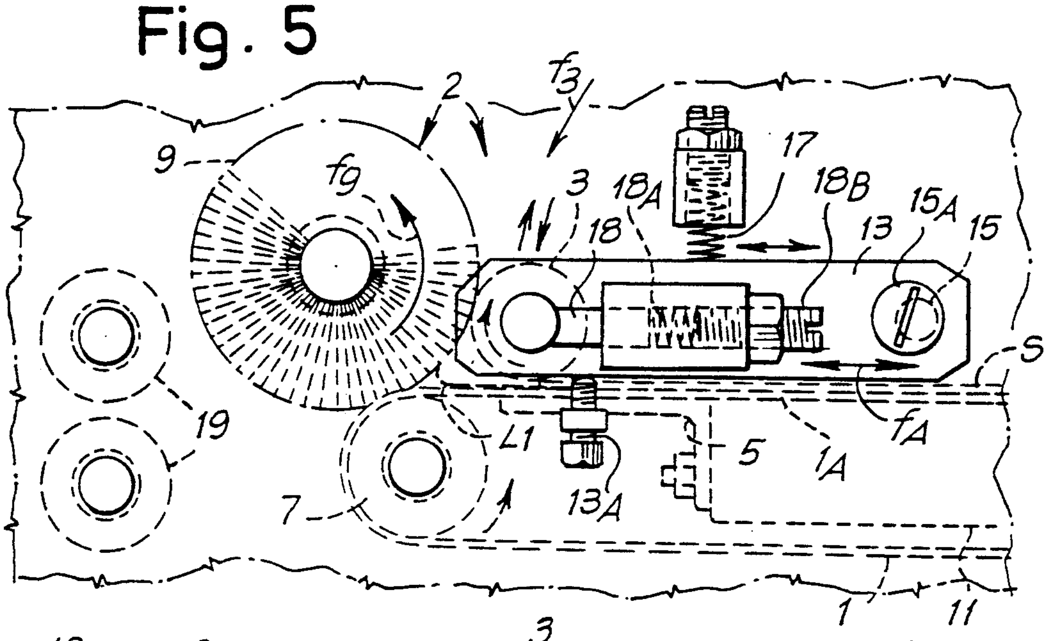
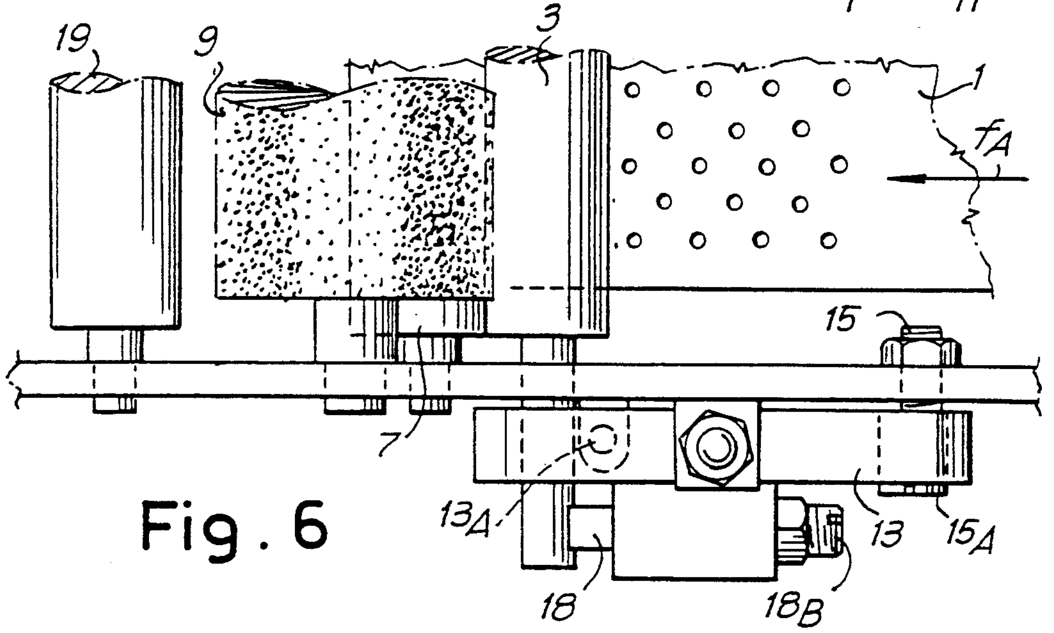
Fig. 6
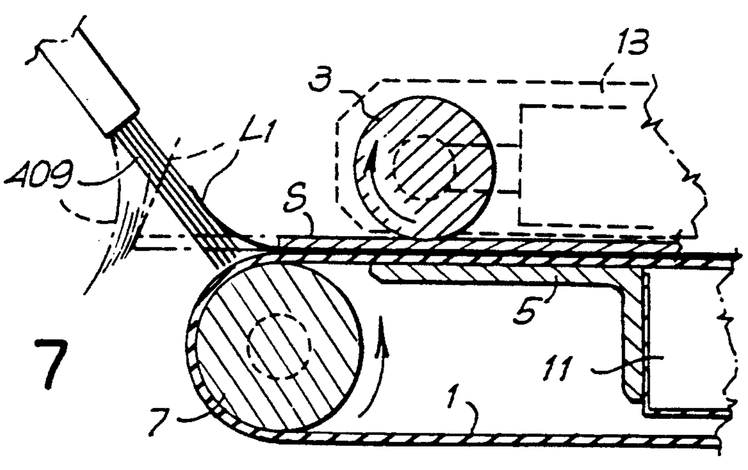
Fig. 7

MACHINE FOR FOLDING AND GLUEING THE FLAPS OF A COATING PAPER TO CARDBOARD

FIELD OF THE INVENTION

The machine that is the object of the present invention is used to manufacture file covers of the type that consist of a sheet of rectangular rigid cardboard a few millimeters and fractions of millimeters thick that is externally covered by a patterned coating paper, to which it is glued. The patterned coating paper is also rectangular in shape, and each of its sides is larger than the sheet of cardboard. The edges of the coating paper project from the edges of the cardboard sheet, and must be bent over and glued to the sheet of cardboard so that the edges and corners of the finished item are properly finished. File covers are then given two central folds so as to give them a book-shaped form.

SUMMARY AND OBJECTS OF THE INVENTION

The aim of the present invention is the creation of a simple, safe machine that is not overlarge in size, designed to produce different sizes of the item in question without entailing complex adjustments. This, and other aims and advantages are set out in the text that follows.

A semi-automatic embodiment of the machine that is the object of the invention substantially includes:

A first assembly with receiving, pressure and feeding elements, through which the part-finished item is fed in a direction at right angles to one of the sides of the item, and after these elements, a first folder element with a line of bristles for folding and glueing the first flap, and a pair of pressure rollers;

A second assembly with receiving, pressure and feeding elements perpendicular to a second side of the part-finished item, with a second folder element and a further pair of rollers for folding the second flap;

Downstream of the second assembly, means for receiving the part-finished item for further work.

In this first semi-automatic embodiment, the same manufactured article can be fed through the machine a second time so that its remaining two flaps can be worked on.

According to a more automatic embodiment, the mentioned machine substantially comprises:

A first assembly with receiving, pressure and feeding elements, through which the part-finished item is fed, and downstream of these elements, a first folder element with a line of bristles, for folding and glueing the first front flap, and a pair of pressure rollers;

A second assembly with receiving, pressure feeding elements set in the opposite direction, with a second folder element and a pair of pressure rollers for folding the second flap, now the front flap;

Downstream of said second assembly, an assembly with a transverse conveyor for moving the part-finished item first in one direction and then in the opposite direction, together with two further assemblies for folding and glueing the remaining two flaps of the paper, one after the other. In this instance, the four flaps are folded in a single cycle.

The folder element with a line of bristles can be a cylindrical roller with radial bristles.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 5 and 6 show a partly sectioned side elevation and plan view of a detail;

FIG. 7 shows a different embodiment of the folder element with a line of bristles;

DETAILED DESCRIPTION OF THE PREFERRED EMBODIMENT

Figure 1:
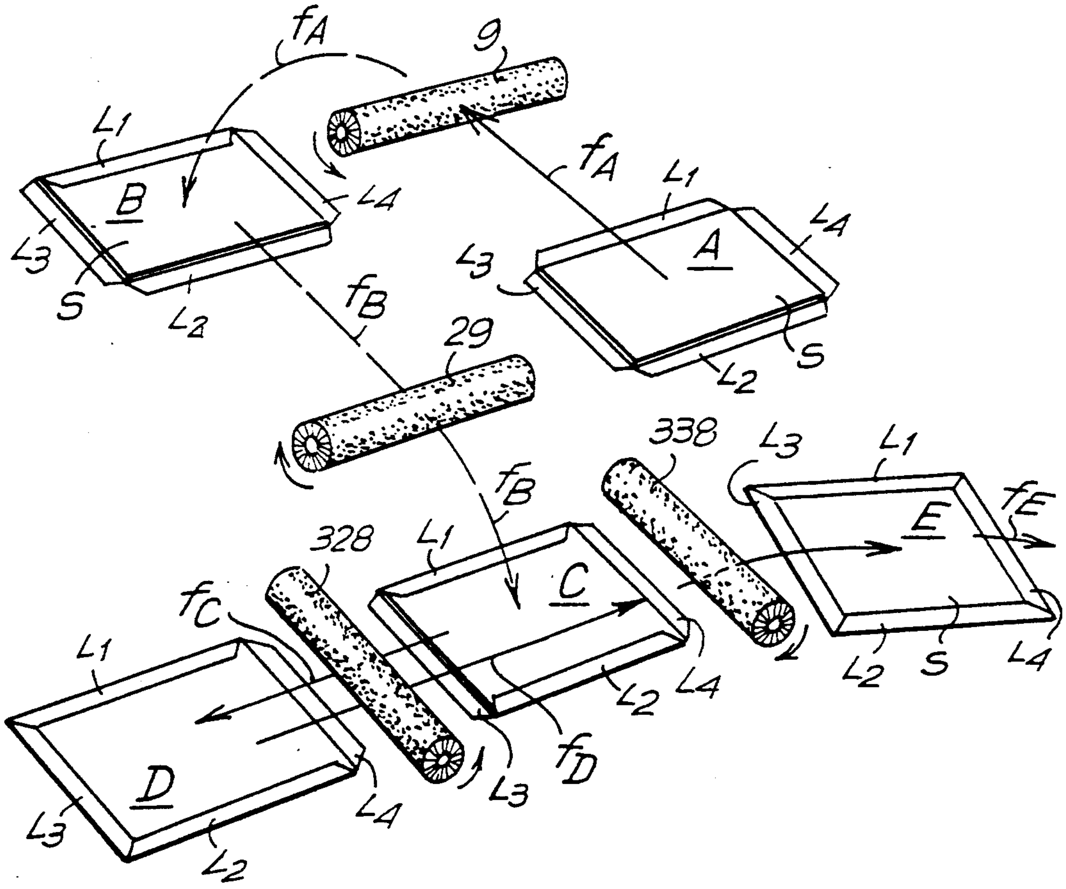
FIG. 1 shows five successive stages of a production cycle.

In FIG. 1, the sheet of coating paper to be backed by a sheet of cardboard (S) has previously been laid flat and spread with glue, so that the sheet of cardboard (S) can be laid on it and centered, leaving the paper flaps (L1, L2, L3 and L4) slightly protruding whilst being parallel to the flaps of cardboard (S). These flaps (L1, L2, L3 and L4) have to be folded as shown in the different stages of FIG. 1, starting from stage A, when the paper is joined to the cardboard, followed by stage B where the flap (L1) is folded, stage C where the flap (L2) is folded, stage D where the flap (L3) is folded, and the final stage E after the flap (L4) has been folded. The arrows (fA, fB, fC, fD) indicate the direction in which the part-finished item is moved in order to fold the flaps, on a stage by stage basis. An arrow (fE) indicates the direction the item is unloaded from the machine.

In FIGS. 2 to 5, the surface (1A) on which the part finished item rests and is fed through consists of the upper extremity of a conveyor belt (1) that moves continuously or intermittently. The conveyor belt (1) can feed the part-finished item in the direction shown by the first arrow (fA) to a first feeding and pressure assembly (2), by the side of the aforementioned surface (1A). This first assembly (2) comprises a pressure and feed roller (3) and a counter-guide (5) positioned one above the other. The surface (1A) of the conveyor belt (1) runs against the counter-guide (5). The part-finished item, moved by the surface (1) in the direction of the arrow (fA), is fed through the receiving, feed, and pressure elements (3 and 5). The minimum distance between these elements can be adjusted so that the distance is slightly less than the thickness of the cardboard (S) and covering paper whose flaps are to be folded. Immediately after these feed elements (3 and 5), there is a conveyor belt return roller (7). Positioned after the return roller (7), there is a bristle folder element, that is constructed in the form of a rotating brush (9) whose lower outline is slightly lower than the conveyor belt surface (1) by the return area on the return roller (7). The bristles of the brush (9) can bend to a greater or lesser extent when the brush rotates in the direction of the arrow (f9). The brush (9) just touches the feed roller (3) thus causing it to rotate. The conveyor belt (1) is driven in the direction of the first arrow (fA), and feeds the part-finished item consisting of the sheet of cardboard (S) and the paper stuck to it with protruding flaps (L1, L2, L3 and L4). To ensure that the part-finished item is fed, the conveyor belt (1) is air-permeable, and a suction head (11) is positioned below the upper extremity of the conveyor (1A), possibly attached at right-angles to the counter-guide (5). A suction duct (12) is connected to the suction head (11). The feed roller (3) (as shown in FIGS. 5 and 6) is held by two jointed arms (13) on pivots (15) mounted on the fixed framework so that the feed roller (3) presses against the belt (1 and 1A) running against the counter-guide (5) and that the minimum distance between belt (1, 1A) and roller (3) can be adjusted. The arms (13) are moved by two suitably adjustable springs (17) that act in the direction shown by the arrow (f3). Although the feed roller (3) idly rotates on these arms (13), it is slowed down to a certain degree by friction pads (18), that are pushed by springs (18A) with adjustment screw rods (18B) and that act on the roller itself or on its pivots. The minimum distance between the feed roller (3) and the conveyor belt (1 and 1A) can be adjusted using screw adjustable pads (13A) on the framework of the counter-guide (5) and the return roller (7) of the conveyor (1). Each pivot (15) can be adjusted using a cam system (15A), or in any other suitable way, and the position of the feed roller (3) in respect of the exterior of the brush can be adjusted.

This arrangement regulates the feed of cardboard (S) attached to coating paper. In particular: a free forward movement of the first flap (L1) underneath the feed roller (3) is obtained; the sheet of cardboard (S) is straightened and the forward movement created by the conveyor (1 and IA) in the direction of the first arrow (fA) causes the front flap to end up resting against the feed roller (3), in a position that is precisely parallel to the feed roller (3), which is free to slow down or stop, before being taken by the conveyor (1) underneath the feed roller (3) and towards the rotating brush (9). The rotating brush (9) slightly touches the feed roller (3), and causes it to rotate, and by interacting with the conveyor (1 and 1A) along the return roller (7), it lifts the front flap (L1) of the paper, folds it along the cardboard edge, and lays it on the upper surface of the cardboard. The elements (3 and 5) press the paper and cardboard together thus strengthening their glue bond. A pair of pressure rollers (19), one of which, possibly the lower one, being motorized, positioned immediately downstream, press the item being fed through them thus stabilizing the flap (L1) folded onto the upper surface of the sheet of cardboard (S). The upper roller can be moved in a direction parallel to itself and can be pressed towards the other roller, which is driven into rotation.

The machine also includes a second receiving assembly (20) for changing the direction of movement. It consists of a continuous conveyor belt (21) that moves in the direction shown by the second arrow (fB), a pair of feed and pressure elements (23 and 25) that are similar to the other feed and pressure rollers (3 and 5), a return roller (27) of the conveyor (21), a rotating bristle brush (29) that slightly touches the conveyor (21) and return roller (27), a suction head (31) with a suction duct (32), and a pair of pressure rollers (39). Also the feed roller (23) is fitted with devices that give it a degree of elasticity, adjust it with respect to the counter-guide (25), and provide a degree of braking action, for the reasons already mentioned for the other roller (3).

This assembly (2) folds the flap (L2) and sticks it onto the cardboard as previously described.

In summary, when the part-finished item—which is formed by paper spread with glue to which a sheet of carboard (S) is attached—is laid on the extremity (1A) of the conveyor belt (1) and fed in the direction of the first arrow (fA), the flap (L1) of the part-finished item passes between the pressure and feed elements (1A, 5 and 3) that engage and press the part-finished item, and feed it in the direction of the arrow (fA) until it is underneath the brush (9) that is the folding element. Its rotating bristles are positioned so that they strike the flap (L1) from beneath and cause it to lift and be folded along the adjacent edge of the sheet of cardboard (S). This flap (L1) is therefore folded on the edge of cardboard (S) and glued to it on the side opposite to the surface covered with paper. The part-finished item is fed and pressed through the pressure rollers (19), until it reaches the conveyor belt (21). When the part-finished item has completely left the pair of pressure rollers (19), it reaches the conveyor belt (21) and is made to adhere to it slightly by the action of suction head (31). Thus the part-finished item is then drawn in the direction shown by the second arrow (fB), and is fed through the elements (23 and 25) and beneath the brush (29), until it passes between the pressure rollers (39). This causes the flap (L2) to be lifted and bent over the adjacent edge of the sheet of cardboard (S) to be glued to it, due to the action of the bristles of the rotating brush (29) and pressure rollers (39).

After leaving the pair of rollers (39), the cardboard is pushed in the direction shown by an arrow (f6) and laid on the upper surface of a conveyor belt (320) positioned adjacent to and beneath the assembly (20) and forming part of an assembly (219) with two bristle folder assemblies (220 and 222) positioned at opposite sides of the conveyor (320). A suction head (321) with a suction duct (321A) works in conjunction with the upper active surface of the conveyor (320).

Figure 2:
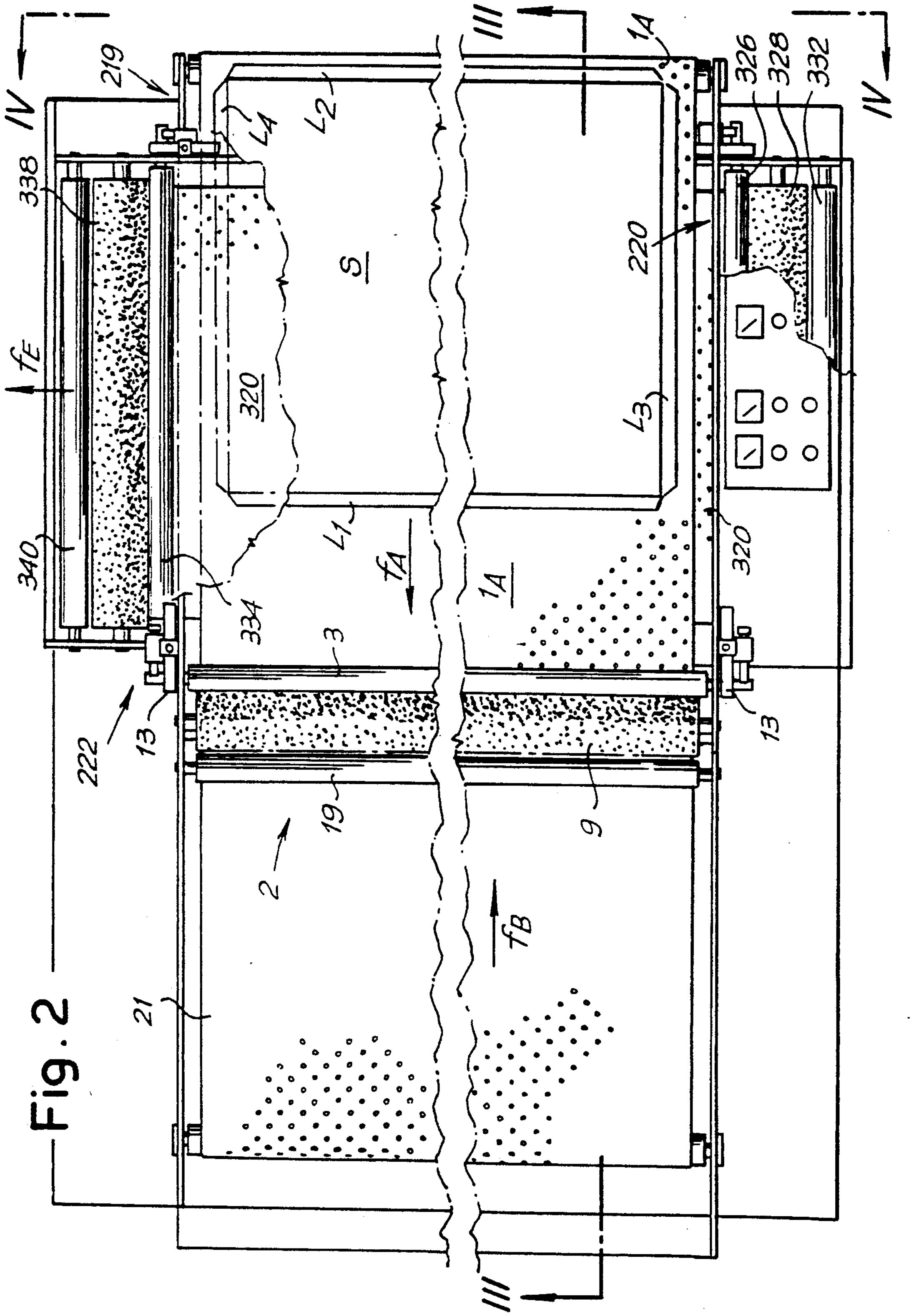
FIG. 2 is a plan view.
Figure 3:
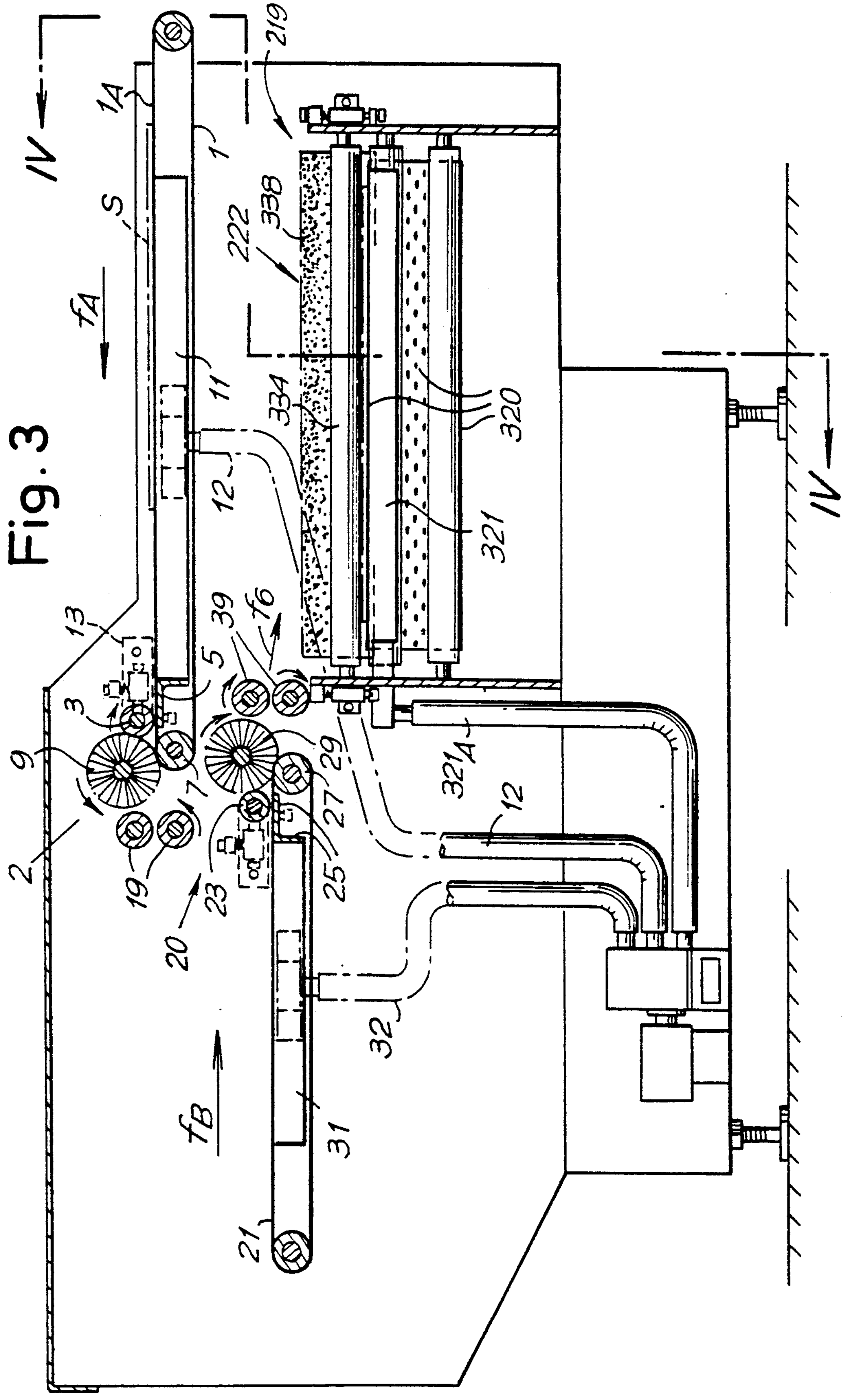
FIG. 3 is a view with lengthwise cross-sections from III—III in FIG. 2.
Figure 4:
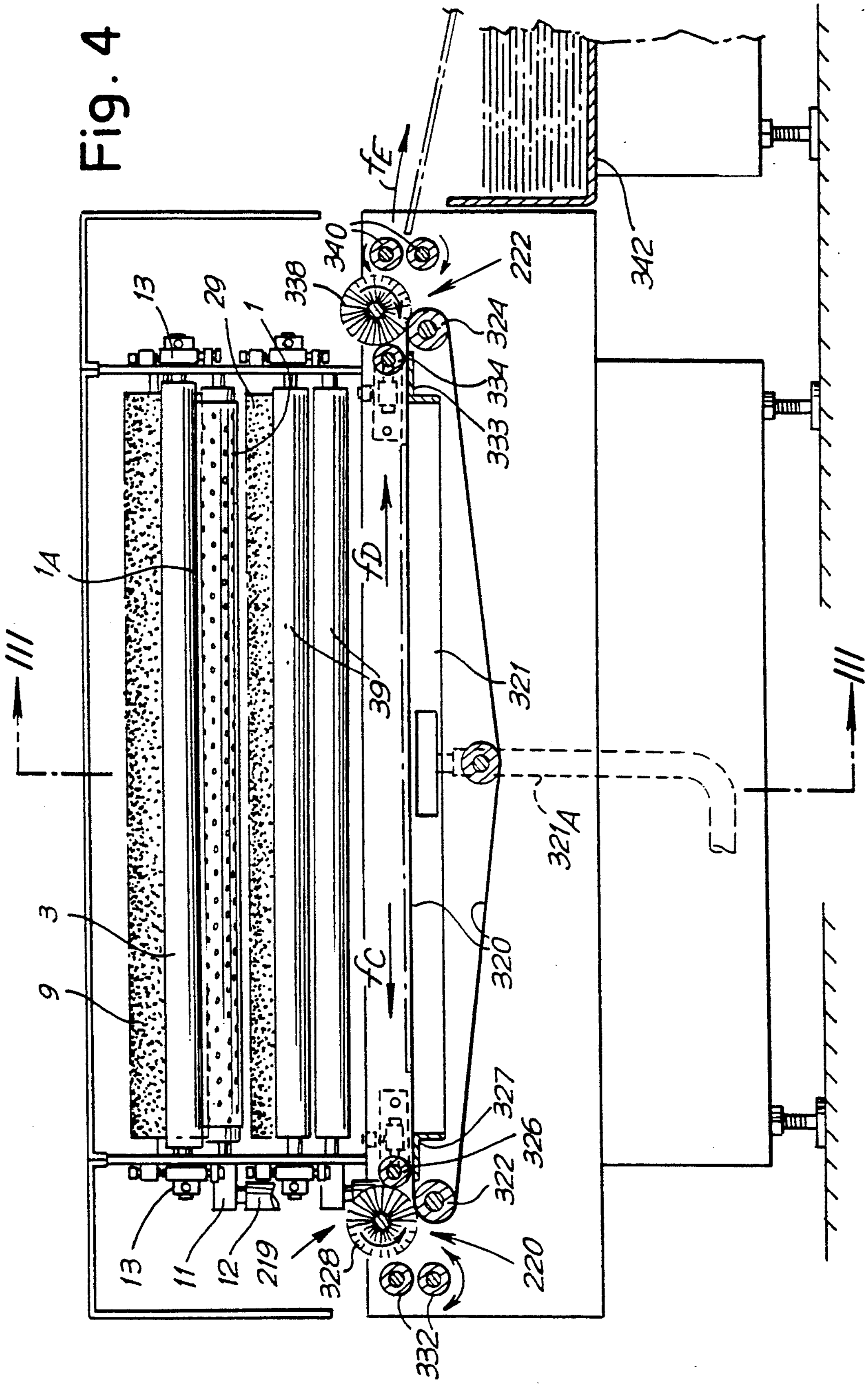
FIG. 4 is a partly cross-sectional view from IV—IV in FIG. 3.

In FIG. 2, it should be noted that the loading and feed surface (1A) has an area substantially equal in size to that of the upper surface of the conveyor (320), and that the part-finished item to be placed on it may be equal or smaller in size. The part-finished item reaches the upper surface of the conveyor (320) after its first flap (L1) has been folded and glued down on its way before reaching the assembly (20) on the conveyor (21) and brush (29), and after its flap (L2) has been successively folded and glued to the sheet of cardboard by the aforementioned rotating brush (29).

The conveyor (320) moves at right angles to the direction of movement shown by the arrows (fA and fB). The conveyor (320) is automatically set in motion after the part finished item has passed through the two rollers (39), the flaps (L1 and L2) have been glued, and the part-finished item has been deposited on the aforementioned conveyor (320). The conveyor (320), after receiving the go-ahead signal as mentioned above, is moved slightly forward, first in the direction of the arrow (fC) towards the assembly (220), and then in the direction of the arrow (fD) towards the assembly (222), thus folding the two remaining flaps (L3 and L4) in succession. During movement in the direction of these arrows (fC and fD), these flaps are in the same position as the two flaps (L1 and L2) were during the first phase of the machine cycle, when they travelled in the direction shown by the two arrows (fA and fB).

The continuous loop transverse conveyor belt (320) has two return rollers (322 and 324). Above the first return roller (322), a pressure and feed roller (326) is fitted to and rotates with the conveyor (320), and together with the counter-guide (327) on which the conveyor (320) runs, forms a pressure and feed system similar to the previously described one (3 and 5), when the conveyor (320) is set to run in the direction of the arrow (fC). The two elements (320 and 326) move the part-finished item being worked and cause it to come into contact with a rotating brush (328) fitted to the exterior of the two elements (326 and 327) that slightly touch and interact with the conveyor (320) and roller (322), and also slightly touch the roller (326). The sheet of cardboard is fed beneath the brush (328), which lifts and folds the flap (L3). Two pressure rollers (332) press a portion of the part-finished item being worked during its short movement in the direction of the arrow (fC). Immediately after the flap (L3) has been folded and glued on the cardboard by the brush (328), and then pressed by the two rollers (332), the conveyor (320) moves in the opposite direction to the arrow (fC). The part finished item being worked is moved in the direction of the arrow (fD), and is fed between the conveyor (320), which slides onto a surface (333), and a roller (334) similar to the one indicated by (326) and (3), and forms a pair of pressure and feed elements with the surface (333) and conveyor (320), that moves in the direction of the arrow (fD) when the item is fed in between them by the conveyor (320). The part-finished item then comes into contact with the rotating brush (338) that slightly touches and interacts with the conveyor (320) and roller (324), and slightly touches the feed roller (334). The brush (338) folds the fourth flap (L4) over and attaches it to the sheet of cardboard (S). Thereafter, while the part-finished item goes forward in the directon of the arrow (fD), it comes across two pressure rollers (340) that press the item and feed it in the direction of the arrow (fE) until it is unloaded into a hopper (342) for stacking, or on a conveyor to be moved away immediately.

In short, after the first two flaps (L1 and L2) have been glued, the item is unloaded on to the conveyor (320) and moved only a short distance in the direction of the arrow (fC) to be worked by an assembly (220) consisting of components (326, 327, 328, and 332) which fold the flap (L3). Immediately afterwards, the conveyor (320) reverses the direction of its movement, and the cardboard is moved in the direction of the arrow (fD) to worked by an assembly (222) consisting of components (333, 334, 338, and 340) which fold the remaining flap (L4) and move the item away from the machine in the direction of the arrow (fE). The conveyor (1) can be controlled by one operator, the assembly (2) can either be driven in conjuntion with the conveyor (1), or operate continuously, as can the second assembly (20). Assemblies 220 and 222 have two motors, for alternate functions.

The machine can also be used as a rolling press.

FIG. 7 shows a different embodiment in which a rotating brush (similar to the one indicated by numbers 9, 29, 328, or 338) is substituted by a fixed brush (409) whose bristles are slanted downwardly in an opposite direction the direction in which the cardboard (S) travels. The bristles act on the flap (L1 for instance), instead of the rotating brush, and bend and cause this flap (L1) to be folded, flattened, and glued to the sheet of cardboard (S), in the same way as the rotating brush.

During each cycle, the machine can work items of any size without needing to adjust any of its components, with the possible exception of selecting the minimum space between pairs of elements (such as: 3 and 5; 23 and 25; 326 and 327; 333 and 334), and deciding which of the rollers (3, 23, 326, 334) are to operate.

The part finished items can be fed into the machine by hand, or using a feeder with different levels of automation. The action of the elements (3 and 5), and equivalent elements in the other similar assemblies ensures a correct angular position of the front edge of the sheet of cardboard on which the flaps (L1 for instance) are to be folded.

The feed and passage of items from one stage to the next is checked and authorized by mechanical, electrical, optical, or other means, to ensure that all stages are properly carried out on each of items worked.

In a simplified embodiment of the machine, the operation is repeated twice by the machine on the same item.

Figure 8:
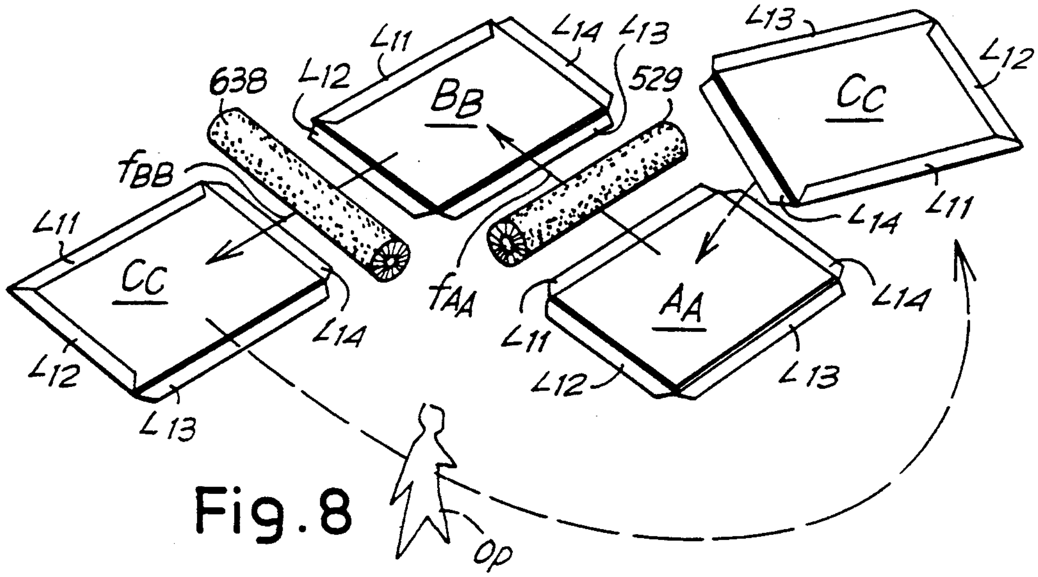
FIG. 8 shows a simplified production cycle.

FIG. 8 is a diagram (similar to the one in FIG. 1) in which the item travels in the direction of the arrow (fAA) from AA to BB, where the flap (L11) is folded and glued down. From position BB it travels according to arrow (fBB) at right angles to the direction of the arrow (fAA) to position CC where the flap (L12) is folded and glued down. Once in position CC, the item is taken once more to the starting position (AA) by hand, but it is rotated so as to present the flap (L14) at the position previously taken by the flaps (L11). The machine carries out a new cycle, thereby folding the flaps (L14) and (L13).

Figure 9:
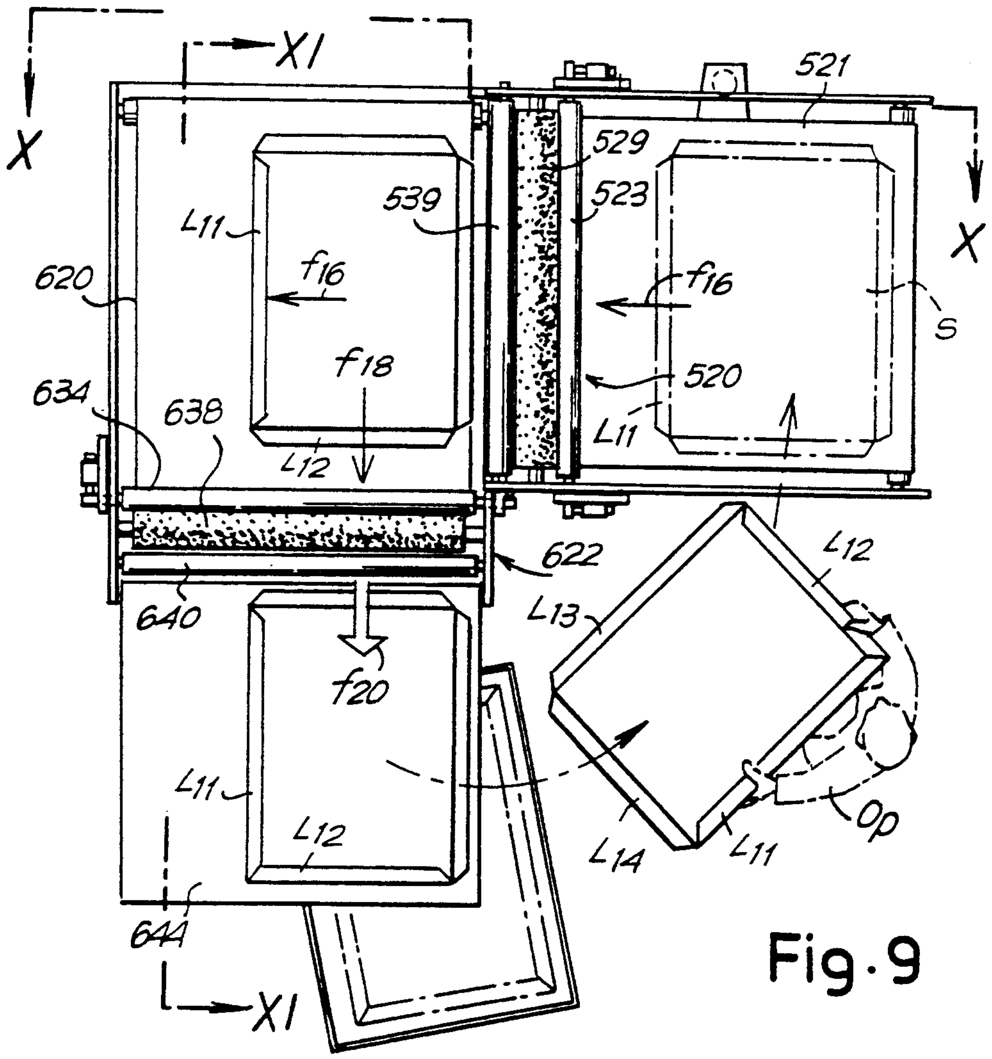
FIGS. 9, 10 and 11 show a plan view and part cross-sections from X—X and from XI—XI of FIG. 9, of a semi-automatic embodiment.
Figure 10:
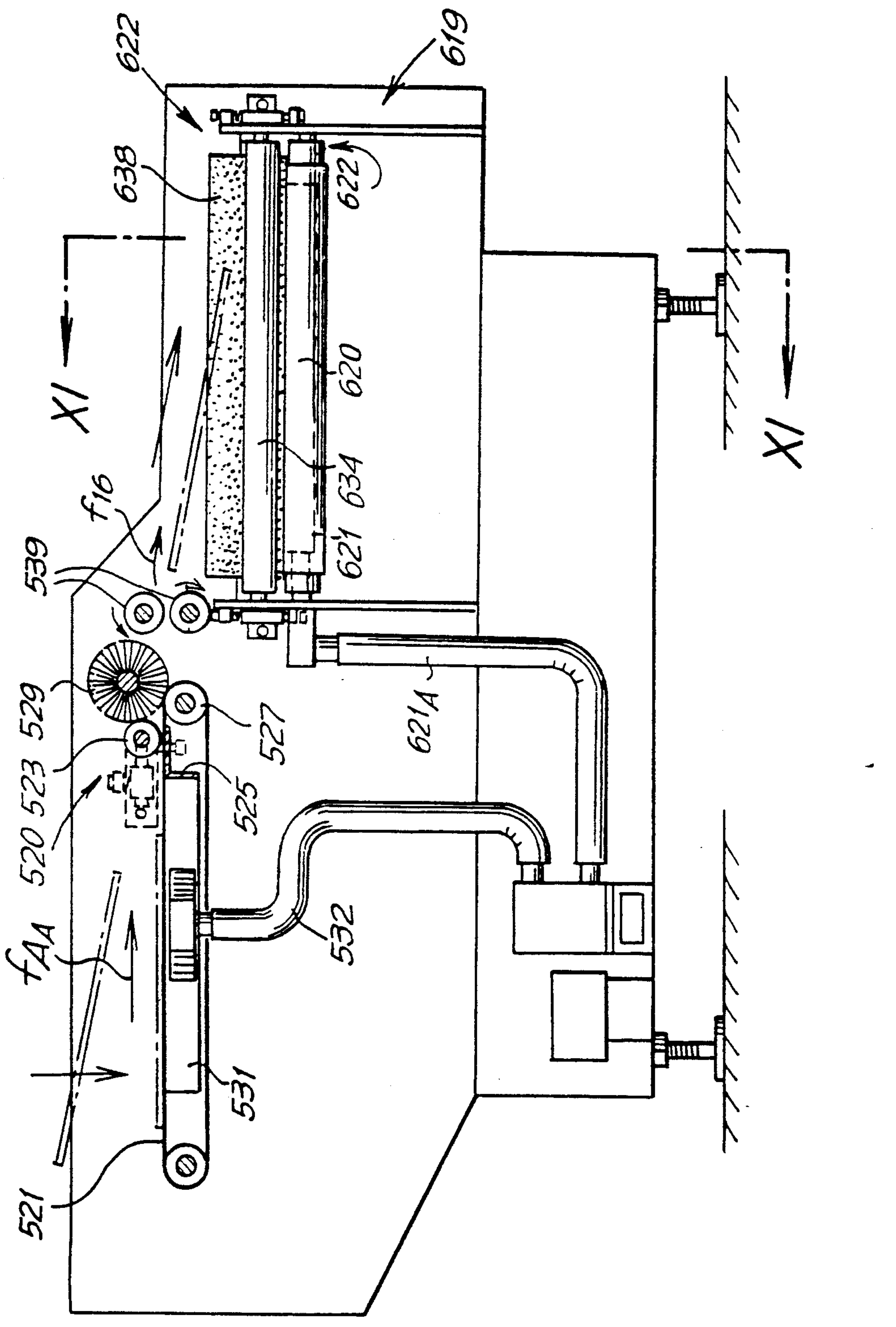
Figure 11:
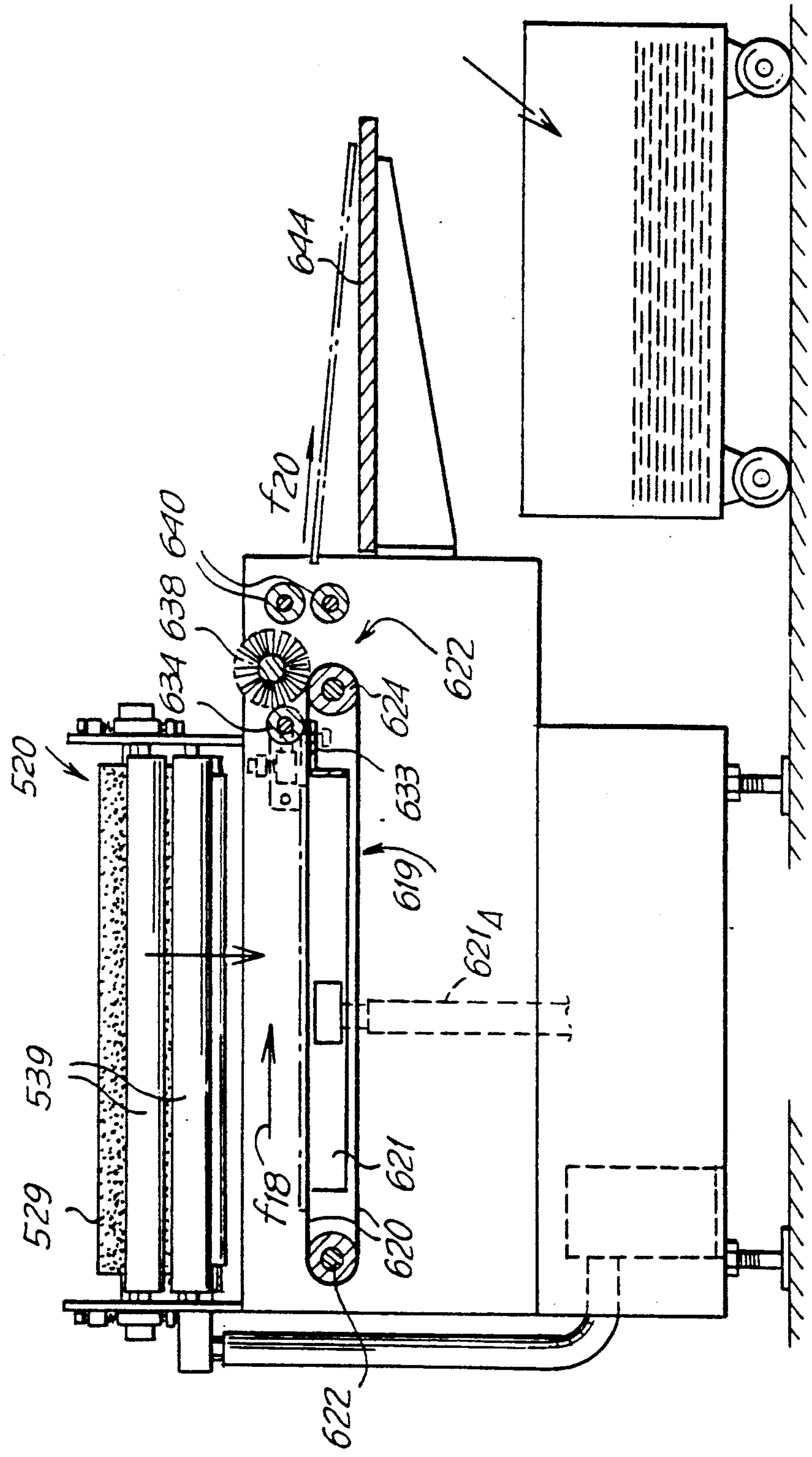

In this embodiment, the machine has a receiving and feed assembly (520) (see FIGS. 9 to 11), fitted with a conveyor belt (521) that moves continuously or intermittently in the direction of the arrow (fAA), a pair of elements (523 and 525), similar to elements (3 and 5), or (23 and 25), a return roller (527) for the conveyor (521), a rotating bristle brush (529) which slightly touches and interacts with the conveyor (521) and return roller (527), a suction head (531) with a suction duct (532), and a pair of pressure rollers (539). There is also a feed roller (523), similar to (3 and 23) with elements for providing degree of elasticity and adjusting it in respect of the counter guide (525), and for braking it to a certain degree for purposes already described for assembly (2) or (20). This assembly (520) folds the flap (L11) and sticks it to the cardboard in the way already described.

After the pair of rollers (539), the sheet of cardboard is pushed on in the direction shown by an arrow (f16) and laid onto the upper surface of a conveyor (620), adjacent to and below the assembly (520) and itself part of an assembly (619) with a folder brush element (622), and placed at the extremity of the active upper surface of the conveyor (620) which moves in the direction shown by an arrow (f18). A suction head (621) with a suction duct (621A) works in conjunction with the active upper surface of the conveyor (620). The conveyor (620) moves in the direction shown by the arrows (fBB and f18) at right angles to the direction of arrows (fAA) and (f16). The conveyor (620) moves automatically after the part-finished item has been fed through the pair of rollers (539), and after the flap (L11) has been glued and the glueing checked.

This continuous type conveyor (620) travels around its two return rollers (622 and 624). In the assembly (622) above the feed roller (624), there is a roller (634) that works in conjunction with the conveyor (620) and which, together with the conveyor and counter-guide (633) (on which the conveyor 620 runs), forms a pair of pressure and feed elements (similar to elements 3 and 5, or 23 and 25) when the conveyor runs in the direction shown by the arrow (f18). The pair of elements (620, 634) move the part-finished item to a point where it is worked by a rotating brush (638), which is positioned outside the pair of elements (634, 624), and which interacts with the conveyor (620) and with roller (624) and slightly touches the pressure roller (634). The sheet of cardboard is fed underneath the brush (638), which lifts and folds the flap (L12). A pair of pressure rollers (640) exert pressure on the item being worked while it moves in the direction shown by the arrow (f18). The item then reaches a surface (644) while it travels in the direction shown by the arrow (f20), with its flaps (L11 and L12) folded. At this point, the operator positions the item once more on the conveyor (521), this time with the flap (L14) facing the assembly (520). In a further cycle, the flaps (L14 and L13) are folded, and the item can then be removed and a new item with all flaps still to fold can be fed in.

An alternative embodiment to that shown in FIGS. 8 to 11 comprises a machine with two conveyor belts (similar to 1 and 21) and two assemblies (as 2 and 20). In this case, after being fed through the assembly (20), the item, whose opposite flaps (such as L11 and L13) have already been folded and glued, is positioned again on the conveyor (1) at right angles to its original position, so that the flaps (L12 and L14) can be folded during a second cycle.

The examples shown in the drawings should only be considered as possible embodiments of the invention, which can have many forms and embodiments whilst remaining within the concept on which the invention is based. The presence of reference numbers in the Claims is for the purpose of making the reference of the Claims to the description and the drawings easier, and do not limit the scope of the protection afforded by the claims.

We claim:

1. Machine for folding and glueing flaps of an item, the machine comprising:

a first assembly with receiving, pressure and feeding elements, through which the item is fed in a first assembly direction at right angles to one of the sides of the item, a first folder element positioned downstream of these elements, said first folder element including a front of bristles for folding and glueing a first flap of the item, and said first folder element also including a pair of pressure rollers;

a second assembly with receiving, pressure and feeding elements, substantially perpendicularly positioned in relation to a second side of the item, said second assembly also including a folder element and a pair of pressure rollers for folding a second flap;

the receiving, pressure, and feeding elements of said first and second assemblies include a guide surface on which a conveyor belt runs, and a pressure feed roller elastically pressed against said guide surface that is free to rotate and having means for adjusting a minimum distance between said pressure feed roller and said guide surface, said folder element of said first and second assemblies is a rotating bristle roller with radial bristles;

downstream of said second assembly, means for receiving the item, for further work or removal.

2. Machine as in claim 1, wherein:

said second assembly includes a conveyor;

said elements of said second assembly for receiving, pressure and feeding, acting in a substantially opposite direction to said first assembly direction;

said second flap being on a substantially opposite side of the item from the first flap;

a transverse conveyor positioned downstream of said second assembly for moving the item in first and second directions substantially perpendicular to said first assembly direction; and two further assemblies for successively folding and glueing third and fourth flaps of the item.

3. Apparatus as in claim 2, wherein:

said conveyor moves in a second assembly direction substantially opposite to said first assembly direction.

4. Machine as in claim 1, further comprising:

a conveyor;

said second assembly being positioned downstream of said conveyor for folding said second flap at right angles with said first flap; and a surface for receiving the item being worked with the first and second flaps already folded and glued, from which the item can be fed into the machine again for folding and glueing third and fourth flaps.

5. Machine as in claim 1, wherein:

said pressure roller has adjustable braking devices, and is held in place by swinging arms with adjustment device for moving said pressure roller closer or to further away from the bristle roller.

6. An apparatus for folding flaps on an item, the apparatus comprising:

a first assembly including means with a first conveyor belt for receiving and feeding a first flap of the item in a first assembly direction, said first assembly also including a folder element positioned downstream of said feeding, said folder element including a bristle means for cooperating with said feeding to fold over the first flap on the item, said first assembly including a pair of pressure rollers downstream of said folder element; and a second assembly positioned downstream of said first assembly, said second assembly including means with a second conveyor belt for receiving and feeding a second flap of the item, said second assembly also including a folder element positioned downstream of said feeding, said folder element including bristle means for cooperating with said feeding to fold over the second flap on the item, said second assembly including a pair of pressure rollers downstream of said folder element;

said second conveyor belt moving the item from said first assembly to said second assembly in a second assembly direction substantially opposite to said first assembly direction;

a third conveyor belt for moving the item from said second assembly in first and second transverse directions substantially perpendicular to said first assembly direction;

a third assembly including means for receiving and feeding a third flap of the item in said first transverse direction from a first end of said third conveyor belt, said third assembly also including a folder element positioned downstream of said feeding means, said folder element including a bristle means for cooperating with said feeding to fold over the third flap on the item; and a fourth assembly including means for receiving and feeding a fourth flap of the item in said second transverse direction from a second end of said third conveyor belt, said fourth assembly also including a folder element positioned downstream of said feeding, said folder element including a bristle means for cooperating with said feeding to fold over the fourth flap on the item.

7. Apparatus as in claim 6, wherein:

said folder element of said first and second assemblies is a rotating bristle roller with radial bristles;

8. Apparatus as in claim 7, wherein:

said first and second assemblies including a conveyor belt; and the bristle rollers of said first and second assemblies slightly touches the respective conveyor belt of said first and second assemblies on a part of said conveyor belt which is entrained over a return roller.

9. Apparatus as in claim 6, wherein:

said folder element of said first and second assemblies is a fixed element with slanted bristles for lifting and folding back a front flap which is moving forward.

10. Machine as in claim 6, wherein:

said third conveyor belt first moves the item in said first transverse direction for a predetermined distance into said third assembly, said predetermined distance being just far enough to fold the third flap, then said third conveyor belt moves the item in said second transverse direction to withdraw the item back out of said third assembly and into said fourth assembly.

11. Machine as in claim 6, wherein:

said folder element of said first, second and fourth assemblies are one of a rotating bristle roller with radial bristles and a fixed element with slanted bristles for lifting and folding back a front flap which is moving forward; and said folder element of said third assembly is a rotating bristle roller with radial bristles for lifting and folding back a front flap which is moving forward.

12. Machine as in claim 11, wherein:

said rotating bristle roller rotates around a fixed axis which is substantially orthogonal to a respective assembly direction of a respective assembly in which said rotating bristle roller is located, said rotating bristle roller touching the respective conveyor belt on a part of said conveyor belt which is entrained over a return roller, and said rotating bristle roller having a tangential direction adjacent the item which is substantially opposite said respective assembly direction.

* * * * *